May 8, 1951

D. C. HARVEY 2,552,276

FILM SPOOL CENTERING PIN

Filed April 11, 1947

DOUGLASS C. HARVEY
INVENTOR

BY

ATTORNEYS

Patented May 8, 1951

2,552,276

UNITED STATES PATENT OFFICE 2,552,276

FILM SPOOL CENTERING PIN

Douglass C. Harvey, Rochester, N. Y., assignor to Eastman Kodak Company, Rochester, N. Y., a corporation of New Jersey Application April 11, 1947, Serial No. 740,763

6 Claims. (Cl. 242—71)

This invention relates to photography and more particularly to spool-centering pins for photographic cameras. One object of my invention is to provide a spool-centering pin which can be readily operated. Another object of my invention is to provide a spool-centering pin which is positively held in an operative, or spool-locating, position and which can be removed from its operative position to an inoperative position with a slight twist of a knob on the end of the pin. A still further object of my invention is to provide a simple and inexpensive spool-centering pin which consists of but few relatively-simple parts. Other objects will appear from the following specification, the novel features being particularly pointed out in the claims at the end thereof.

Coming now to the drawings wherein like reference characters denote like parts throughout:

Figure 1:
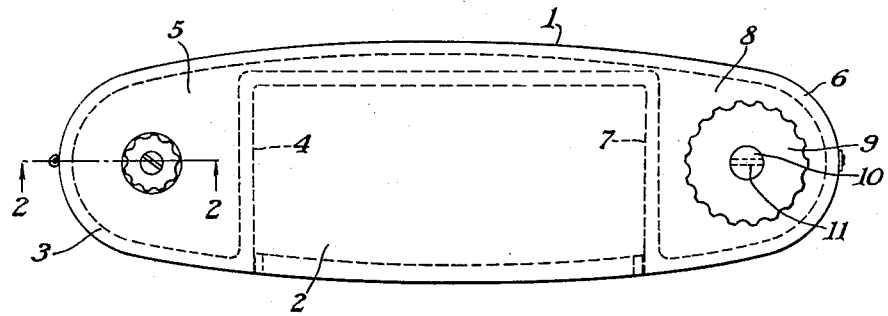
Fig. 1 is a bottom plan view of a typical camera equipped with a spool-centering pin constructed in accordance with and embodying a preferred form of my invention.

In Fig. 1, I have shown a typical camera 1 for use with roll film, this camera having a bottom wall 2 and a curved wall 3 which, with an inside wall 4, forms a supply film chamber 5. A similar end wall 6 with an inner wall 7 forms a take-up film chamber 8, all as is well known in the photographic art. The camera may be provided with a winding knob 9 carried by a shaft 10 passing through the camera wall 2, this shaft having a flange 11 adapted to enter a slot in the end of a film spool S to turn the spool in the usual manner.

It is customary to support a spool S in the supply film chamber 5 on centering pins and one or both of these centering pins may be of the construction which will now be described.

A spool-centering pin 12 may be formed by the end of a shaft 13 which passes through a camera wall 2, this wall, in the present instance, being formed of an inner section 14 and an outer section 15. A bushing 16 is preferably threaded at 17 to screw into the threaded area 18 of the inner wall 14. This bushing may have a flange 19 to clamp the outer wall 15 to the inner wall 14 and it contains an opening 20 in which the shaft 13 is slidably mounted. Spaced ribs 28 and 29 having a groove between them lie inside the film chambers of the camera for guiding a film spool S into place.

Figure 2:
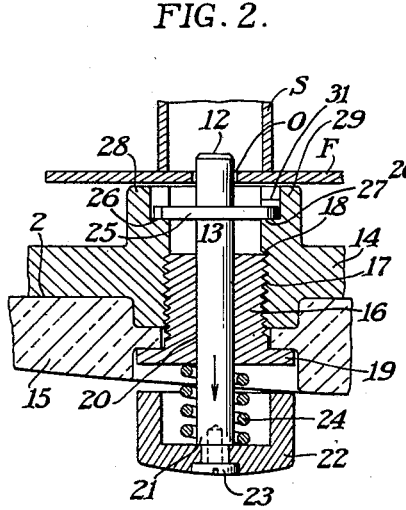
Fig. 2 is a fragmentary detailed section taken on line 2—2 of Fig. 1, the spool-centering pin being shown in an operative spool-carrying position.
Figure 3:
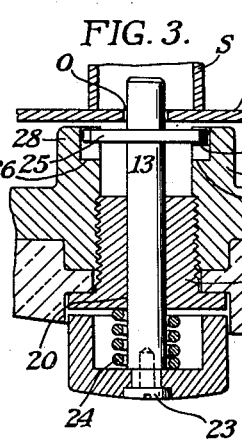
Fig. 3 is a view similar to Fig. 2 but with the spool-centering pin being moved inwardly during the first part of the releasing movement of the knob.
Figure 4:
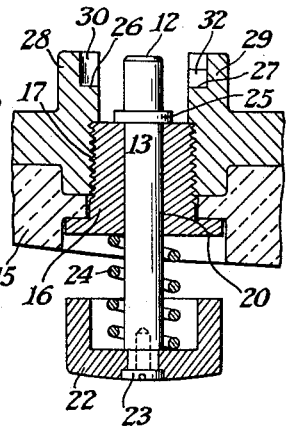
Fig. 4 is a view similar to Figs. 2 and 3 but with the spool-centering pin moved to its inoperative position.
Figure 5:
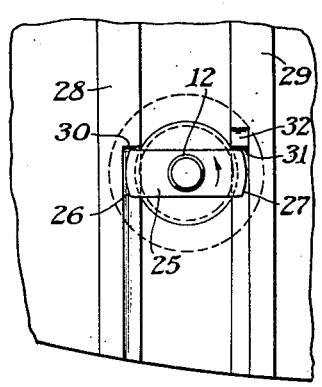
Fig. 5 is a fragmentary elevation showing the spool-centering pin in its operative position.
Figure 6:
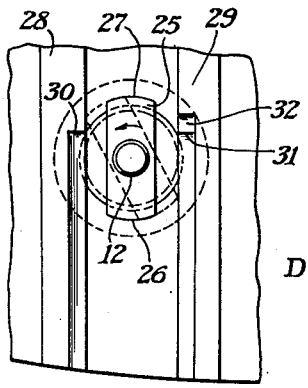
Fig. 6 is a view similar to Fig. 5 but with the spool-centering pin in an inoperative position.

The outer end 21 of the shaft carries a knob 22 which may be held in place by a screw 23. A spring 24 pressing against the flange 9 and the inside of the knob 22 normally exerts an outward thrust in the direction shown by the arrow in Fig. 2 so that this spring tends to remove the pin 12 from the supporting opening O in the film flange F. However, the movement of the shaft 13 may be opposed by an elongated flange 25 carried on the inner end of the spool-centering pin 12, this flange being so shaped that when turning in a transverse direction, as shown in Fig. 2, it may rest on the seats 26 and 27 formed on the ribs 28 and 29 carried by the inside wall 14. As best shown in Fig. 5, the seats 26 and 27 are formed by grooves extending partway through the ribs 28 and 29, one of the grooves terminating in a shoulder 30 and the other groove terminating in a shoulder 31. Adjacent the shoulder 31 is an area 32 which permits clearance for the turning movement of the elongated flange 25, so that this flange can only be turned in the direction shown by the arrow in Fig. 5 and this turning movement can take place only when the transverse flange 25 is moved over the shoulder 31, as indicated in Fig. 3. Thus, in releasing the spool-centering pin 12 from a spool, the knob 23 is thrust inwardly, as indicated in Fig. 3, raising the transverse flange 25 above the shoulder 31. Then, by turning the knob through approximately 90 degrees to remove the transverse flange 25 from the seats 26 and 27, the spring 24 may then be permitted to thrust the spool-centering pin 12 outwardly and into its inoperative position of Fig. 4. In this position the end of the spool-centering shaft 12 lies below the ends of the ribs 28 and 29 so that it cannot obstruct the insertion or removal of a spool S.

Usually, it is sufficient to provide one spool-centering pin of the construction above described because it is convenient to have one fixedly-mounted pin for supporting one end of the film spool and make one of the spool-centering pins movable for the insertion and removal of the spool. However, if desired, a movable spool-centering pin may be placed on each side wall of the camera to support each end of the film spool and, if desired, a movable spool-centering pin may be used opposite to the winding knob 9.

The operation of my invention is exceedingly simple. In loading a camera, a film spool is merely dropped into the supply spool chamber 5, the flanges F being guided by the ends of the ribs 28 and 29. The flanges slide freely until the center of the spool lies opposite the pin at which time the operator merely pushes the knob 23 inwardly, turns the knob approximately at right angles and into the Fig. 3 position, after which the spring 24 may move the knob outwardly a slight distance as the transverse flange 25 becomes seated in the spaced seats 26 and 27. The spool-centering pin 12 will then lie in the Fig. 2 position in which it will firmly hold the spool S in proper position. There is little or no tendency for the spool-centering pin to be accidentally misplaced because the transverse bar 25 cannot be turned from its Fig. 2 position without first moving the knob inwardly to the Fig. 3 position.

This spool-centering pin construction permits the use of a relatively-small knob 22 because there is very little work which needs to be done by this member in loading and unloading the camera. Moreover, the spring 24 only tends to remove the spool-centering pin 12 from the spool S after the spool-centering pin has first been manually moved in a reverse direction and turned a short distance.

I claim:

1. A spool-centering pin for roll film cameras having spool chambers and walls enclosing the spool chambers including a bushing in a camera wall, a shaft carrying the centering pin slidably mounted therein, a knob on the shaft outside of the camera, a spring between the knob and bushing tending to move the knob outwardly, an elongated inner flange on the shaft between the shaft and pin, a flange seat in the bushing with which the flange may cooperate, said flange seat having an elongated groove and including a pair of spaced ribs against which the elongated flange may rest with the spring under compression and with the centering pin in a spool-engaging position, said elongated groove lying between the spaced ribs into which the elongated flange may pass as the spring moves the shaft outwardly when the knob turns the shaft and flange through an angle to release the elongated flange from the spaced seats.

2. The spool-centering pin defined in claim 1 characterized by the angle through which the knob must be turned to release the elongated flange from the spaced seats being approximately 90°.

3. The spool-centering pin defined in claim 1 characterized by a shoulder on one of the spaced seats for preventing turning movement of the elongated flange in one direction.

4. The spool-centering pin defined in claim 1 characterized by the groove between the spaced seats being a depth at least equal to the length of the pin from the elongated flange to the inner end of the pin whereby the pin may be completely withdrawn from possible contact with a film spool.

5. A spool-centering pin for roll film cameras having spool chambers enclosed by camera walls, one spool chamber having an axial opening extending into an end of one spool chamber, a bushing in the opening, a shaft carrying the centering pin slidably mounted for limited axial movement therethrough, a knob on the outer end of the shaft, a spring between the knob and bushing tending to move the pin outwardly and into an inoperative position, an elongated flange carried by the inner end of the shaft, and means carried by the camera wall for holding the shaft inwardly against spring pressure when said elongated flange is positioned on said means, the elongated flange being removable from said means by manual movement of the knob.

6. The spool-centering pin construction defined in claim 5 characterized by said means carried by the camera wall for holding the pin inwardly including a recessed seat from which said elongated flange may be moved by moving the knob inwardly and turning said elongated flange from the seat.

DOUGLASS C. HARVEY.

REFERENCES CITED

The following references are of record in the file of this patent:

UNITED STATES PATENTS

| Number | Name | Date |
|---|---|---|
| 1,201,002 | Treadaway et al. | Oct. 10, 1916 |
| 1,419,323 | Smith et al. | June 13, 1922 |
| 2,357,328 | Harris | Sept. 5, 1944 |

FOREIGN PATENTS

| Number | Country | Date |
|---|---|---|
| 576,722 | Great Britain | Apr. 17, 1946 |